(12) United States Patent
Fenton et al.

(10) Patent No.: US 7,509,340 B2
(45) Date of Patent: *Mar. 24, 2009

(54) DYNAMIC GRAPHICAL INDEX OF WEBSITE CONTENT

(75) Inventors: Nicholas W. Fenton, Los Angeles, CA (US); Michael F. Mannarino, Studio City, CA (US); Wendy Springer, Los Angeles, CA (US); Andrew Schneider, Los Angeles, CA (US); Marlowe J. Dayley, Los Angeles, CA (US); Alex Shmelev, Pacific Palisades, CA (US); Holly Thai, El Monte, CA (US); Jacob S. Manaster, Beverly Hills, CA (US); Rodney C. Newby, New York, NY (US); John Jeffrey Byer, Glendale, CA (US)

(73) Assignees: Sony Corporation, Tokyo (JP); Sony Pictures Entertaiment Inc., Culver City, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 11/338,268

(22) Filed: Jan. 23, 2006

(65) Prior Publication Data

US 2006/0123038 A1    Jun. 8, 2006

Related U.S. Application Data

(63) Continuation of application No. 09/915,608, filed on Jul. 26, 2001, now Pat. No. 6,990,498.

(60) Provisional application No. 60/298,372, filed on Jun. 15, 2001.

(51) Int. Cl.
*G06F 17/00* (2006.01)

(52) U.S. Cl. .................................................. 707/102

(58) Field of Classification Search .............. 707/104.1, 707/102; 709/217–219; 715/700, 762, 748, 715/749
See application file for complete search history.

(56) References Cited

U.S. PATENT DOCUMENTS 6,311,194 B1    10/2001   Sheth et al.
6,345,256 B1    2/2002    Milsted et al.

(Continued)

OTHER PUBLICATIONS

Loren Terveen et al, "Constructing, Organizing, and Visualizing Collections of Topically Related Web", ACM Transaction on Computer-Human Interaction, vol. 6, No. 1, Mar. 1999, pp. 67-94.*

(Continued)

*Primary Examiner*—Uyen T. Le
(74) *Attorney, Agent, or Firm*—Samuel S. Lee; Procopio, Cory, Hargreaves & Savitch LLP

(57) ABSTRACT

A dynamically updateable graphical index for rapidly scanning through content available on a website. The index comprises user-selectable levels within branches of a hierarchical tree structure representing various categories and sub-categories of content available on the website. All content on the website is associated with meta-data. The categories and sub-categories correspond to this meta-data. As content is added to the website, the content's associated meta-data is dynamically incorporated into the index and is searchable within the hierarchical tree structure displayed to the user.

20 Claims, 8 Drawing Sheets

U.S. PATENT DOCUMENTS

| | | |
|---|---|---|
| 6,370,562 B2 | 4/2002 | Page et al. |
| 2002/0052885 A1 | 5/2002 | Levy |
| 2002/0052954 A1 | 5/2002 | Polizzi et al. |
| 2002/0059120 A1 | 5/2002 | Milton |
| 2002/0083006 A1 | 6/2002 | Headings et al. |
| 2002/0091792 A1 | 7/2002 | Janniello et al. |

OTHER PUBLICATIONS

Product Description pages for Sound Forge XP Studio 5.0 from website of Sonic Foundry (http://www.sonicfoundry.com); Nov. 13, 2001.

Product Description pages for Sound Forge 5.0 from website of Sonic Foundry (http://sonicfoundry.com); Nov. 13, 2001.

PCT International Search Report as issued in International Application No. PCT/US02/15822, Mailing Date Aug. 2, 2002.

PCT International Search Report as issued in International Application No. PCT/US02/15792, Mailing Date Sep. 3, 2002.

Shivakumar et al., "Wave-Indices: Indexing Evolving Databases", ACM 1997, pp. 381-392.

Ester et al., "The DC-Tree: a Fully Dynamic Index Structure for Data Warehouses", Data Engineering, 2000. Proceedings. 16th International Conference Feb. 29-Mar. 3, 2000, pp. 379-388.

* cited by examiner ated by reference. The present application also relates to co-pending U.S. utility patent applications entitled "Content Management System and Process," Ser. No. 09/906,023, filed Jul. 13, 2001, and "Media Content Creating and Publishing System and Process," filed Jul. 13, 2001, the content of both of which is also incorporated by reference herein.

DYNAMIC GRAPHICAL INDEX OF WEBSITE CONTENT

RELATED APPLICATIONS

This application claims priority to Provisional Application No. 60/298,372, filed Jun. 15, 2001, which is hereby incorporated by reference. The present application also relates to co-pending U.S. utility patent applications entitled "Content Management System and Process," Ser. No. 09/906,023, filed Jul. 13, 2001, and "Media Content Creating and Publishing System and Process," filed Jul. 13, 2001, the content of both of which is also incorporated by reference herein.

This application is a Continuation of Ser. No. 09/915,608, filed Jul. 26, 2001, now U.S Pat. No. 6,990,498 the disclosure of which is incorporated herein by reference.

BACKGROUND OF THE INVENTION

1. Field of the Invention

The present invention relates generally to systems and processes for on-line publishing of media content, and more particularly to a dynamically updateable graphical index to content contained within a broadband creativity platform for creating, editing, sharing and publishing of media content online.

2. Description of Related Art

In modern network environments, including the Internet, various forms of media content are made available to network users. For example, Internet users may access a variety of Internet sites in order to play electronic files containing music, videos, images, photos, or other media content, for example, on a media player. Typically, such Internet sites comprise a large number of such files. Also, typically, the Internet site may provide to a user of the site search tools which may enable the user to locate files, for example, by filename.

Some sites may, in addition, provide a graphical menu of content that is available on the site. Such menus are, typically, implemented in HTML or DHTML. As content is added to or deleted from the site, these menus must be updated by site programmers and administrators. This may involve large expenditures of time and money resulting from the manual updating of such menus by programmers and/or website administrators on a weekly, daily, or even hourly basis.

Therefore, there is a need for a dynamically updateable graphical guide to an Internet site's content which provides for rapid and automatic updating of added or deleted content on the site.

SUMMARY OF THE DISCLOSURE

Embodiments of the present invention overcome problems in the existing art as described above by providing a dynamically updateable graphical guide which displays to a user hierarchical branches and levels of categories of content available on the website.

Embodiments of the invention may operate within an online environment including one or more user network devices and one or more server network devices connected by a communications link to the one or more user network devices.

Further embodiments of the present invention provide search functionality based on hierarchical categories of information about content available on the website which enables a user to search for content according to the information.

In one embodiment, the invention's search and graphical guide functionality is employed on a website accessible to the user through a web browser which displays to the user a number of Web pages and other programmed elements which facilitate a media content creating and publishing process by allowing the user to create and edit media content items, store the media content items in a user storage area, manage the media content items within a user storage area, share media content items with other users, and configure and manage user showcase pages to display the user's media content items.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout.

DETAILED DESCRIPTION OF EMBODIMENTS OF THE INVENTION

Figure 1:
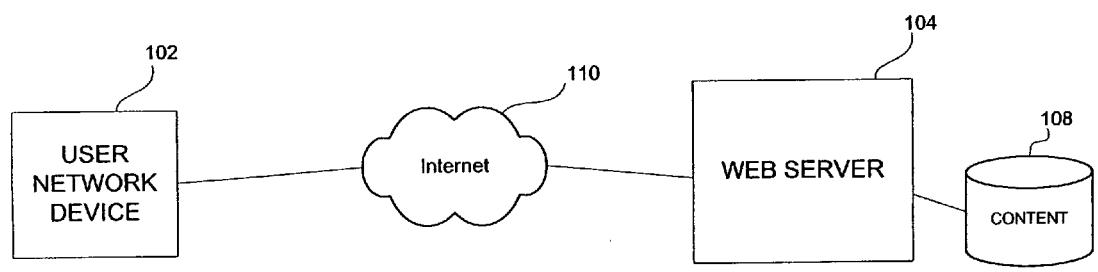
FIG. 1 is a simplified view of an exemplary client-server environment in which a system and process according to embodiments of the invention may be employed.

In the following description of embodiments of the invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Embodiments of the present invention relate to a dynamically updateable graphical guide to content available on a broadband creativity platform for creating, editing, sharing, and publishing of media content items online. In example embodiments, the broadband creativity platform is implemented as a website on which users are provided with digital assets and tools required for on-line and off-line creating and editing of media content items, as well as tools for sharing media content items between users, and for on-line publishing of media content items. The term "digital assets" is used herein to refer to media content made available for use by a website user in the user's own media creations. The terms "media content" and "media content item" are used herein to refer to all forms of electronic content (i.e., content that may be read or processed in an electronic form), including, but not limited to, digital video, audio, photos, graphics, text, and animation.

Embodiments of the dynamically updateable graphical guide provide one or more functions including, but not limited to: (1) enabling website users to rapidly navigate through content available on the website by selecting levels within branches of a hierarchical tree structure representing various categories of content; (2) enabling a user to see a display of content corresponding to the selected level; (3) enabling rapid and automatic updating of graphical guide and (4) enabling the user to search for content on the website based on hierarchical categories of information about content.

An embodiment of the dynamically updateable graphical guide may be employed in a network of computer systems. The components of the network may be interconnected across a wide area network, such as, but not limited to, the Internet. At the top level, server network devices ("servers") support the operation of the broadband creativity platform and store digital assets and other media content that may be accessed by users of the platform. The digital assets and other media content may be licensed from independent providers by the website or owned by the website. The servers also reserve storage space for user-created media content that may be created and uploaded by the user to the platform.

The website may contain a homepage and a tree of numerous additional Web pages inter-linked with the homepage at the root. The pages of the website may be of various types, such as, but not limited to user settings pages, user profile pages, user showcase pages, user biography ("bio") pages, channel (genre) pages, and zone pages. Users may also activate, view, and utilize the functionality of pop-up screens ("poppers") within pages including, but not limited to, audio poppers, video poppers, and tool poppers. The user may browse through the website by following links within the pages of the website, user selectable operators such as virtual buttons (designated selectable icons or areas) and menus, lists, and the like.

All media content items on the site, from whatever source, may be associated with "meta-data." Meta-data may be description or classification data regarding the media content items that may be entered by the user or website administrators, and may be used, for example, by a content management system associated with the website to upload, store, organize, and manage the media content items.

The website's homepage may contain links to other pages on the website, as well as to other websites. Users may manage favorite links by accessing, adding and deleting favorite links. In one embodiment, the homepage may contain user-selectable operators for selecting a desired functionality. The homepage may also contain user-selectable promotional areas ("promotes") which may be, for example, graphic images that are linked to the promoted page, popper, advertisement, website, or other promoted entity.

Digital assets and tools may be made available to users of the website who have registered and logged on to the website. Users may subscribe (for example, pay a fee) in order to obtain access to the digital assets and tools that are available. Alternatively, scaled-down versions of digital assets and tools may be made available to the registered or un-registered users of the website at no charge. Full-versions of these tools may be purchased or leased from the website for a fee.

Media creation and editing tools may be accessed and downloaded by the user for on-line or off-line creation and editing of the user's own media content items. Media content items created by website users may be uploaded to the website and stored in a storage area made available to users. These stored media content items may be organized and managed by the user in various ways, such as, but not limited to, defining, sorting, searching, sharing, and deleting the stored media content items.

The website may also provide to the user a "showcase page" on which to display this content to other users of the platform, for example, in templates with pre-defined styles. The showcase page may be viewable by other users of the platform. The showcase page may be linked to a user "biography page" where the user may display personal and other information to other users.

The home page may contain user-selectable operators which provide to the user the choice of "experiencing," "creating," or "connecting" media content on the website. Depending on the user's purpose, the user may choose one of these three operators.

When a user chooses to "experience" media content, the user may experience (i.e., view, hear, or otherwise perceive) media content licensed from independent sources, as well as media content that has been created by users of the website. In one embodiment, when the user chooses to experience media content, the user may be presented with a further choice between various user-selectable operators, each linked to a particular channel home page. A channel home page may be the main page on which a particular genre of media content (for example, comedy, drama, action, science fiction, horror, or music) is presented. This main page contains promotes that link to other pages or present media content to the user.

When a user chooses to "create" media content, the user may be provided access to media creation and editing tools to create and/or edit media content. The user may also be provided with digital assets in the form of "asset packs." These asset packs may contain, for example, video and audio segments that may be incorporated into or combined with the user's own media content. For example, each asset pack may comprise audio and video segments related to a particular genre. As an example, an "action" asset pack may comprise video and/or audio segments of explosions, car chases, and gun battles. Similarly, a "comedy" asset pack may comprise video and/or audio segments of stand-up comedians, skits from television and radio shows, and scenes from comedy films. As an additional example, a "music" asset pack may contain video and/or audio segments of music being played by popular musical groups. Using media creation and editing tools, the user may insert video, animation, audio and other digital media into, for example, pre-defined templates and timelines.

The channel home pages may comprise user-selectable operators that link to digital assets associated with the genre on that channel home page. Thus, for example, the user can experience the action channel home page and then select a create user-selectable operator on that page which may link the user to an action asset pack. The action asset pack may contain, for example, video, audio, and animation segments of action scenes, including, but not limited to, explosions, car chases, and fight scenes. The user may then use the action segments in the user's own creations. As an example, the user may have video showing a child falling off a bike. The user may insert a video segment of an explosion obtained from the website at the point in the user's video where the child falls. The user may then display this video on the user's own user showcase page on the website.

When a user chooses to "connect" media content, the user may, for example, be presented with an upload page or popper wherein the user may enter information about the media content (meta-data). The media content may then be uploaded to the user's showcase page on the website. The user showcase page may be accessed, in one embodiment, by entering the website's Uniform Resource Locator ("URL") followed by /"USERNAME," where "USERNAME" is a name unique to the user associated with the showcase page. A particular user's showcase page may then be accessible to other users of the website who enter that user's user name after the website's URL. Thus, the user may connect with other users of the website by having a showcase page on which to display the user's creative media content and by being able to search for and access other user's showcase pages.

System Hardware Environment

FIG. 1 is a simplified view of an exemplary client-server environment 100, such as the World Wide Web (the Web), in which the dynamically updateable graphical guide may be implemented. The architecture of the Web follows a conventional client-server model. The terms "client" and "server" are used to refer to a computer's general role as a submitter of requests for data (the client) or provider of data (the server). The client, also referred to as User Network Device ("UND") 102, and Web server 104 communicate using a protocol such as HyperText Transfer Protocol (HTTP). In the Web environment, Web browsers reside on clients and render Web documents (pages) served by the Web servers. The client-server model is used to communicate information between UND 102 and Web server 104.

Web server 104 is coupled to a network 1 10, for example the Internet, and responds to document requests and/or other queries from Web clients. Other embodiments may employ other networks. While the actual sequence of events and operation of the main pages of the website vary with different embodiments, in one example embodiment a user first connects to the website using a web-browser, such as Netscape Navigator or Internet Explorer. The user may then log into the website with a user identifier and password or may log in as a guest. A new user may also register with the website to establish a user identifier and password.

During the login process and registration, the website may derive information about the user's UND to provide proper support for the user's interaction (for example, to determine the optimum bandwidth to use). When a user selects a document by submitting its URL, the Web browser opens a connection to Web server 104 and initiates a request (e.g., an HTTP get) for the document. Web server 104 delivers the requested document, typically in the form of a text document coded in a standard markup language such as HyperText Markup Language (HTML) or Dynamic HTML (DHTML). Additionally, website pages may be coded in Java, JavaScript, Flash, or any other suitable programming or scripting language.

UND 102 may be any type of computing device such as, but not limited to, desktop computers, workstations, laptops, and/or mainframe computers. Additional variations may also be implemented such as interfaces for wireless telephones, PDAs, media players, and for satellite download capability. One or more users (not shown) may be associated with each UND 102.

The UND 102 may also include software, hardware, firmware or combinations thereof, for converting digital content into user-perceptible media content. When a UND 102 is connected in communication with the server 104, the website may be displayed, on a display device (not shown) connected locally to UND 102, as a user interface for allowing a user to receive user-perceptible information from the server 104 and communicate information to the server 104, including, but not limited to, requests for media content downloads, uploads, or requests to link to additional pages, poppers or other websites.

Web server 104 may also be any type of computing device such as, but not limited to, desktop computers, work stations, laptops, and/or main frame computers. In website embodiments, the server 104 may include or operate with a memory system 108 for storing website content, comprising data for creating or generating text, images, designs or other indicia that compose one or more website "elements," including, but not limited to, showcase pages, user biography pages, "channel (genre) pages", "zone pages," poppers, and promotes. Website elements stored on memory system 108 may further include media content items supplied by the website, as well as "personalized media content items" (i.e., media content items selected by, created by, or edited by the user). Web server 104 may be connected to a local display device (not shown) for displaying website elements to website administrators for purposes including, but not limited to, programming, managing, testing, and maintaining the website.

System and device functions and processes described herein may be implemented with machine-executable instructions. Software comprising these instructions may be used to program and cause general-purpose or special-purpose processors to perform the functions and processes described herein. Alternatively, such functions and processes may be implemented by firmware, hardware comprising hardwired logic, or by any combination thereof.

In one example embodiment, users may be provided with computer program products comprising a machine-readable medium storing software for programming a computer (or other UND as described above) to perform processes carried out by the UND relating to the dynamically updateable graphical guide, according to the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

In another example embodiment, UNDs are programmed with software downloaded to the UNDs as computer program products. The software, for example, media creating and editing tools, may be downloaded or transferred from a remote processor (for example, a server) to a requesting processor (for example, a UND) by way of data signals embodied in a carrier wave or other propagation medium via a communication link (for example, a modem or other wired or wireless network connection, a satellite signal receiver or other broadcast signal receiver, or the like). The user may connect to the website across the Internet, using UND 102. In one embodiment, UND 102 may employ standard Web-browsing software to connect to and interact with the website. In other embodiments, customized software, hardware, firmware or combinations thereof, may be employed by UND 102 for interacting with server 1 04. The user may connect to the website by, for example, connecting to the address or URL associated with the website.

Rich Media Bandwidth Detector

As discussed above, during the login process and registration, the website may derive information about the user's UND to provide proper support for the user's interaction. The derived information may include, but is not limited to, information about the user's operating system, information about the user's Web browser, and information about whether particular software (for example, Flash, Java, and/or Javascript) is enabled on the user's UND. If the user's UND does not meet these minimum requirements, an error message may be displayed to the user along with information about how the user may, for example, upgrade their UND and/or enable required software. If the user's UND meets the minimum requirements, the website may next check the connection bandwidth for the user's UND.

The broadband creativity platform may be a website comprising "rich media" content, i.e., content which, for example, is rich in graphics, animation, audio, and video. Thus, a user's UND may require a high bandwidth capacity in order to optimally use the website. For example, in one embodiment, a user's UND may require a bandwidth capacity of at least 128 Kilobytes (KB) per second for optimal use of the website.

In one embodiment, the website checks the user's connection bandwidth and provides options to the user if the user's UND does not meet the minimum bandwidth requirement. The website may perform the check by first downloading a small file (for example, a 50 KB file) to the user's UND. The website may then download a larger file (for example, a 500 KB file) to the user's UND. The website may then compare the download speed for both files. The website may use the comparison to determine the connection bandwidth of the user's UND.

Figure 2:
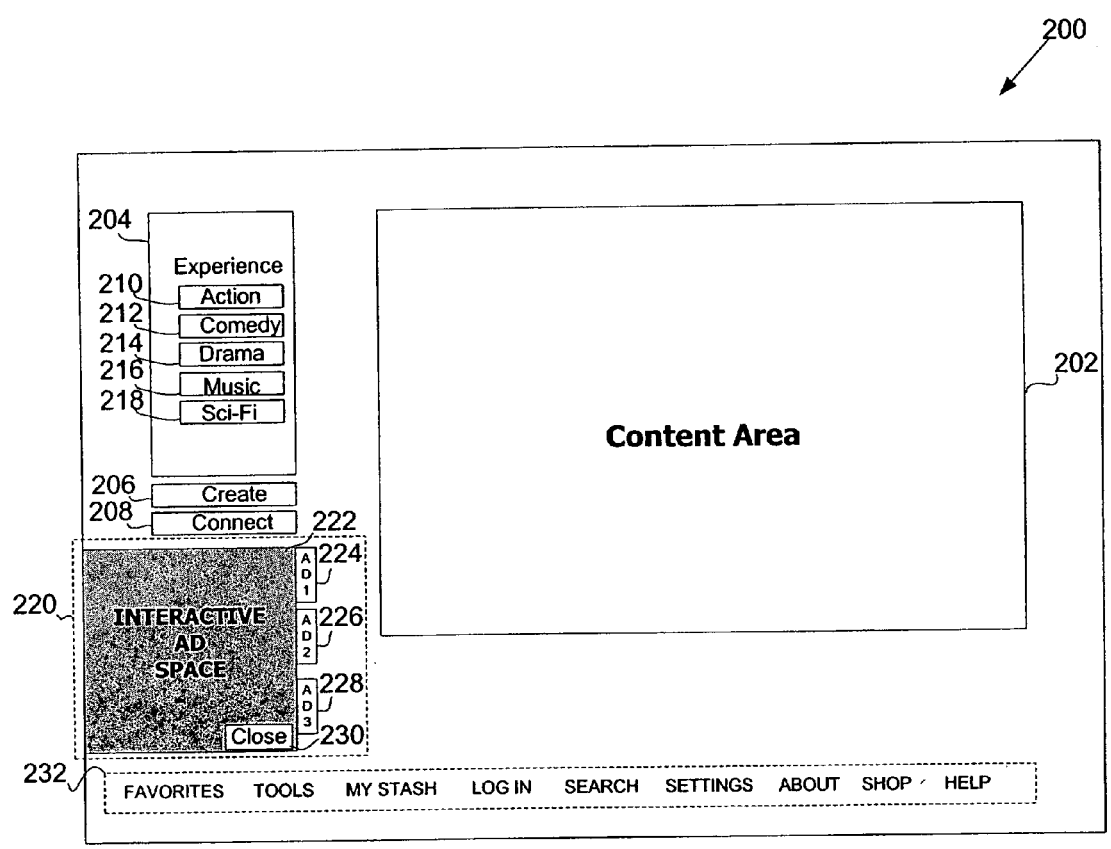
FIG. 2 shows an exemplary website homepage, according to an embodiment of the invention.

If the connection bandwidth of the user's UND is less than the minimum required bandwidth, then an error message may be displayed to the user along with information about upgrading to a higher bandwidth connection (for example, DSL, cable modem, or T1). If the connection bandwidth of the user's UND is equal to or greater than the minimum required bandwidth, then parameters on the user's UND (for example, streaming video bit rate) may be adjusted to correspond to the detected speed. The user may then be brought to the website's home page, as shown in FIG. 2.

Exemplary website homepage 200 may allow the user to experience, create, and connect media content. The website content, as well the arrangement of website content on the website pages, may vary depending upon the embodiment. Exemplary website homepage 200 comprises content area 202, "experience" channel area 204 (comprising user-selectable operators 210 (action), 212 (comedy), 214 (drama), 216 (music), and 218 (science fiction) for selecting a genre of media content), a "create" user-selectable operator 206, a "connect" user-selectable operator 208, broadband advertising unit 220, and menu area 232.

Content area 202 may comprise media content items including, but not limited to, video segments, stills, photos, animation, and graphics. Content area 202 may also comprise promotes which may link the user to, for example, other pages or poppers within the website, in addition to linking the user to other websites.

Broadband advertising unit 220 may comprise a window that slides back and forth over a portion of the window comprising homepage 200. The Broadband advertising unit 220 may display to the user advertisements for companies, services and products. Menu area 232 may comprise menu items that expand when being clicked, or otherwise being selected by a user, to show additional functions from which the user may choose. The menu area 232 may comprise menu choices including, but not limited to, "favorites" (a link to areas, pages, or media content items that are of interest to the user and that the user has previously designated as favorites), "Tools" (a link to tool pages where the user may, for example, create or edit media content), "My Stash" (a link to media content that the user has previously saved to a storage area ("stash") provided to the user by the website), "Log in" (links to a log in page so that the user may log into the website), "search" (links to a search page so that the user may perform searches based on user-defined criteria), "settings" (links to a settings page so that the user may enter and edit settings such as the user's password and user name), "about" (links to about pages that provide the user with information about the website), and "shop" (links to shopping pages on which the user may purchase merchandise offered by the website or by independent vendors).

Broadband Advertising Unit

In one embodiment, the broadband advertising unit 220 is implemented in Flash and may comprise an advertisement display area 222. Advertisement display area 222 may comprise one or more user-selectable operators, for example, hyperlinks. When selected, the hyperlinks may launch a new browser window displaying, for example, the advertiser's website or one or more streaming advertisements.

In one embodiment, when an advertisement is linked to the broadband advertising unit 220, a user-selectable operator, for example, a tab, corresponding to the advertisement will be displayed along the periphery of broadband advertising unit 220. The tab or other user-selectable operator may contain text, graphics, or some other indicia that is indicative of the particular advertiser or advertisement.

Multiple user-selectable tabs may be linked to corresponding multiple advertisements. A tab corresponding to each-linked advertisement may be displayed, for example, along the periphery of broadband advertising unit 220. In FIG. 2, exemplary tabs 224, 226, and 228 are shown along the periphery of broadband advertising unit 220. Each of tabs 224, 226, and 228 may correspond to one or more advertisements that have been linked to the broadband advertising unit 220 by website programmers or administrators. As new advertisements are linked to the broadband advertising unit 220, the indicia on the tabs may be updated to reflect the updated advertisements.

In one embodiment, the broadband advertising unit 220 may "slide" "on-screen" and "off-screen" automatically at pre-determined intervals. In addition, or in the alternative, the on-screen or off-screen appearance of broadband advertising unit 220 may be controlled by the user.

In one embodiment, when operating in the automatic mode, the broadband advertising unit 220 may periodically slide on-screen and off-screen without any prompting from the user. After fully extending automatically on-screen, the broadband advertising unit 220 may remain fully extended and display a first advertisement or series of advertisements for a predetermined interval (for example, five seconds). The broadband advertising unit 220 may then slide off-screen again.

Figure 3:
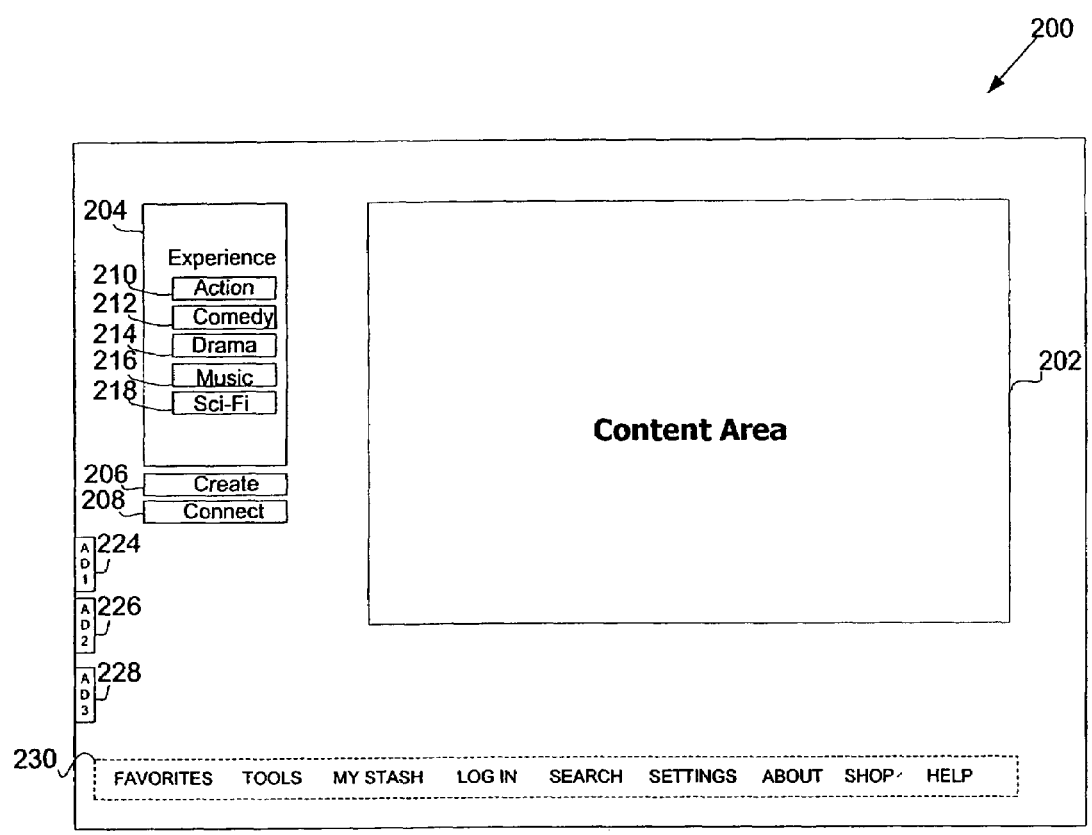
FIG. 3 shows user-selectable advertisement tabs for initiating a display of a broadband advertising unit, according to an embodiment of the invention.

The broadband advertising unit 220 may then remain off-screen for a predetermined interval (for example, 20 seconds). The broadband advertising unit 220 may then again slide on-screen and display, for example, a second advertisement or series of advertisements for the same or a different predetermined interval. In some embodiments, when the broadband advertising unit 220 is otherwise off-screen, the tabs may still be visible along the side of the screen (as shown in FIG. 3) and may be selectable by the user (user-controlled) to cause the broadband advertising unit 220 to slide on-screen at a time controlled by the user, without the user having to wait the predetermined time interval.

In one embodiment, once the broadband advertising unit 220 has been fully extended on-screen automatically, a timer or other indicia of time measurement may be displayed to the user within the advertisement display area 222 shown in FIG. 2. The timer may, for example, keep track of the time remaining before the broadband advertising unit 220 automatically slides off-screen again. As an example, the timer may initially indicate that five seconds remain. The timer may then count down, for example, one second at a time, to zero, at which time the broadband advertising unit 220 may automatically slide off-screen. A user may, in this way, be kept apprised of the time remaining before the broadband advertising unit 220 automatically slides back off-screen.

In one embodiment, after the broadband advertising unit 220 has been fully extended on-screen automatically, the user may interact with the broadband advertising unit 220. In some embodiments, interaction may comprise, for example, a user rolling over (for example, with the mouse cursor) the broadband advertising unit 220. When the user rolls over the broadband advertising unit 220, the timer and the advertisement currently displayed in advertisement display area 222 may be suspended until the user has removed the mouse cursor from broadband advertising unit 220. If the user has taken no other action while rolling over the broadband advertising unit 220 (for example, by clicking the advertisement display area 222), the user may roll off the broadband advertising unit 220 to resume the timer count down.

In some embodiments, interaction with the broadband advertising unit 220 may further comprise selection of an advertisement by the user, for example, by clicking (or otherwise selecting) the advertisement display area 222. In addition, in some embodiments, the user may change the advertisements that are displayed in advertisement display area 222 by selecting, from the tabs displayed along the periphery of the broadband advertising unit 220, the tab containing indicia of the desired advertisement. In some embodiments, while in the automatic mode such tab selection may only be performed by the user when the broadband advertising unit 220 is off-screen. If there is no interaction with the broadband advertising unit 220 by the user, the broadband advertising unit 220 may slide back off-screen after the predetermined time.

As discussed above, in one embodiment, if the user selects advertisement display area 222, a browser window may be launched for displaying to the user, for example, the advertiser's website or one or more of the advertiser's streaming media advertisements. Once the user has viewed the website or advertisements, the user may close the browser window.

In one embodiment, while in the automatic mode, when the user has selected an advertisement within advertisement display area 222 and a browser window has been opened, the broadband advertising unit 220 may remain on-screen after the browser window has been closed. Thus, in this embodiment, the broadband advertising unit 220 may not close automatically after the user has selected an advertisement in advertisement display area 222. Instead, the user may select a user-selectable operator, for example, the "Close" user-selectable operator 230, to close (i.e., slide off-screen) the broadband advertising unit 220.

As discussed above, in one embodiment, when the broadband advertising unit 220 is off-screen, tabs such as tabs 224, 226, and 228 may still be visible to the user, as shown in FIG. 3. The user may control when the broadband advertising unit 220 slides on-screen by clicking (or otherwise selecting) a tab to initiate the action.

When the broadband advertising unit 220 has fully extended on-screen in the user-controlled mode, an advertisement corresponding to the user-selected tab may be displayed in advertisement display area 222 shown in FIG. 2. When the user has initiated (i.e., controlled) the sliding on-screen of broadband advertising unit 220, the timer may not be displayed as in the automatic mode. Instead, the broadband advertising unit 220 may remain on-screen until the user selects the Close user-selectable operator 230.

As an alternative method for closing (i.e., sliding off-screen) broadband advertising unit 220, in one embodiment, the user may select a new tab when the broadband advertising unit 220 is fully extended. The broadband advertising unit 220 may then slide off-screen, remain off-screen for a predetermined interval, and then slide back on-screen with the advertisement corresponding to the new tab displayed in advertisement display area 222.

In the user-controlled mode, the user may interact with the broadband advertising unit 220 in the same ways as described above for the automatic mode. Thus, the user may select advertisement display area 222 to launch a browser window.

When the browser window is launched, either in the automatic or user-controlled modes, the home page may be masked by an opaque layer and all functionality on the home page may be suspended until the browser window is closed. In this way, the user is able to optimally focus on the browser window.

User-Created Advertisements

Figure 4:
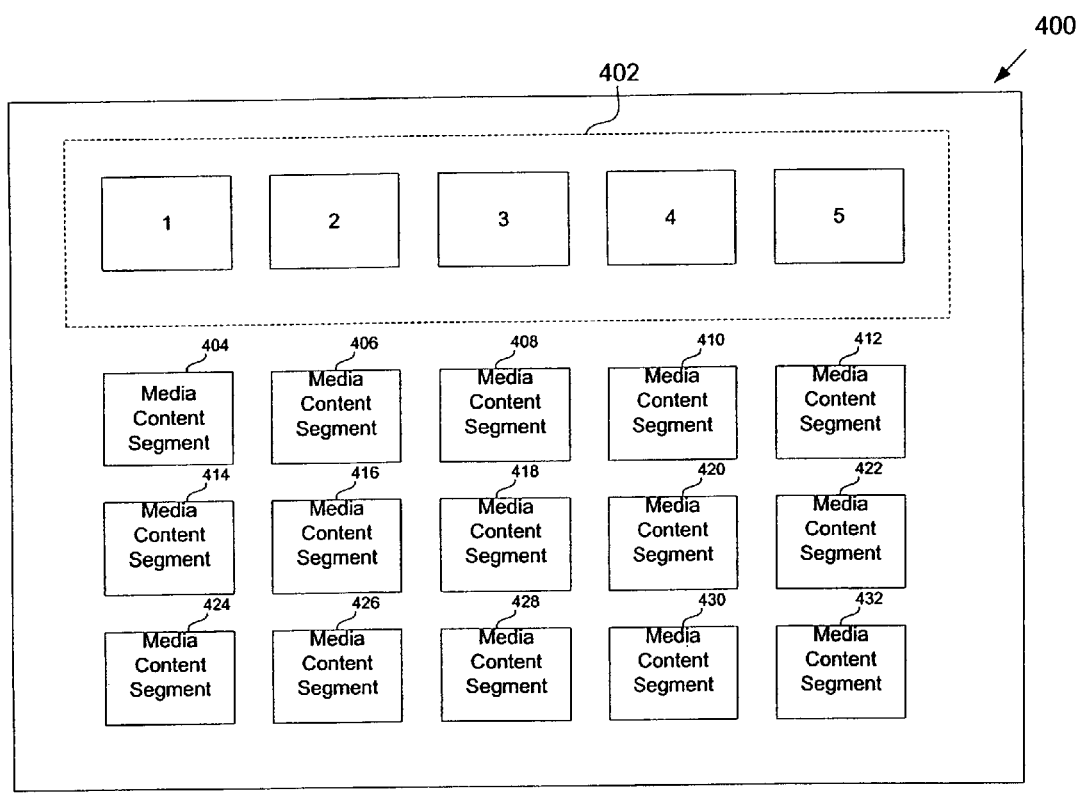
FIG. 4 shows an exemplary advertisement creating and editing application, according to an embodiment of the invention.

Referring again to menu area 232 in FIG. 2, when users select "Tools" in menu area 232, a list of tools may be displayed to the user. In some embodiments, users may select an advertisement creating and editing tool. The advertisement creating and editing tool may comprise a software application that the user may use either on-line or off-line to create and edit the user's own advertisements. When an advertisement creating and editing tool is selected, a page or popper comprising the advertisement creating and editing tool may then be displayed to the user. In some embodiments, the advertisement creating and editing tool may facilitate the creation of personalized advertisements by providing a timeline into which the user may, for example, drag and drop pre-existing media content segments in order to create an advertisement comprising a continuous media sequence. An example of such a timeline is shown in FIG. 4. FIG. 4 shows exemplary advertisement creating and editing application 400, which presents to the user a timeline 402, which comprises a number of empty media content "containers" (five in the present example).

As described above, these media content containers may be filled with pre-existing video, audio, and animation segments such as media content segments 404, 406, 408, 410, 412, 414, 416, 418, 420, 422, 424, 426, 428, 430, and 432 by, for example, dragging and dropping a copy of a media content segment into a media content container. Any particular media content segment may comprise an audio or video fragment, for example, a fragment of an existing advertisement or a fragment of a movie clip.

Figure 5:
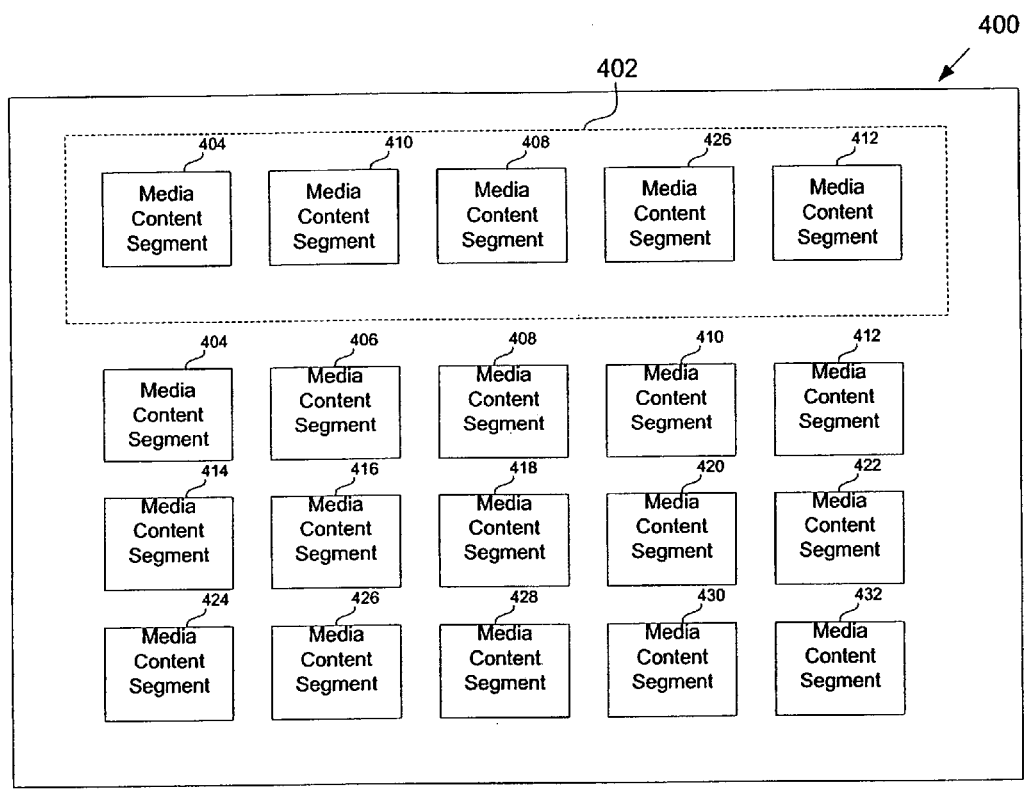
FIG. 5 shows a populated timeline, according to an embodiment of the invention.

FIG. 5 shows an example of a populated timeline 402. As shown in FIG. 5, a copy of media content segment 404 has been placed in media content container 1 in timeline 402. Similarly, a copy of media content segment 410, media content segment 408, media content segment 426, and media content segment 412 have been placed in media content containers 2 through 5, respectively.

In one embodiment, the timeline may be saved as a single file to the user's stash and from there may be linked, for example, to the user's personalized media content accessible to other website users on the user's showcase page. Thus, when other users access and play the user's personalized media content, the personalized advertisement may also be played, for example, by the media player. Thus, by enabling the user to drag and drop a number of the media content segments into timeline 402, advertisement creating and editing application 400 facilitates the creation of personalized advertisements by a user.

In some embodiments, traditional advertisers (for example, corporations) may wish to place advertisements on user showcase pages. This may be the case, for example, when the content available on a particular user's showcase page is known to be accessed by a large number of users. The advertisements may comprise, for example, selectable icons, text links, or other selectable indicia that may, for example, launch a browser window. The browser window may display, for example, the sponsor's website or a streaming media advertisement.

An advertiser may sponsor that user's showcase page by providing advertisements for display on the page. In the alternative, the advertiser may sponsor the creation of a personalized advertisement by the user, as described above, which may include reference to the sponsor's product or services. In either case, the user may receive, all or a portion of any remuneration provided by the sponsor.

Dynamically Updateable Graphical Index

Figure 6:
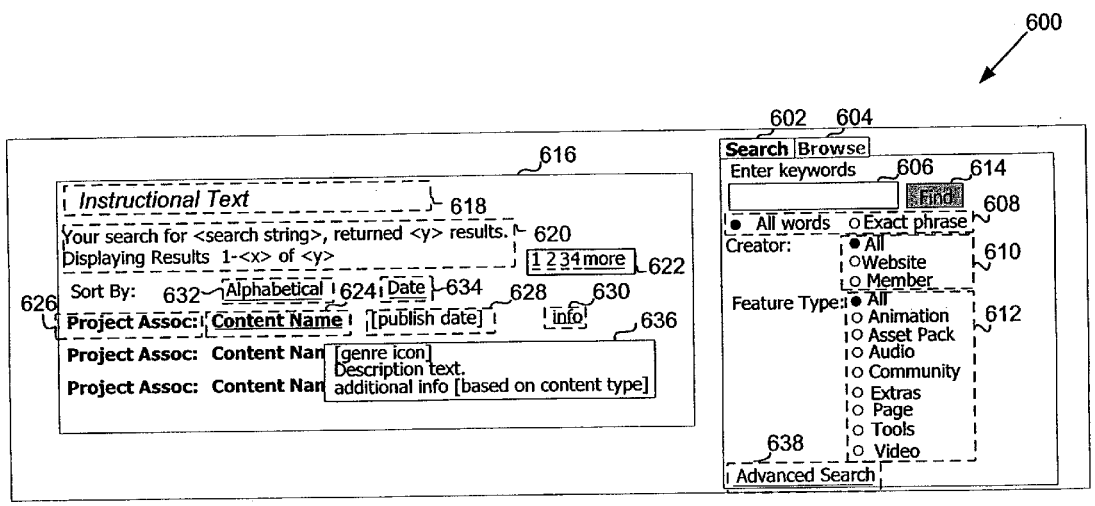
FIG. 6 shows an exemplary Guide page with search functionality, according to an embodiment of the invention.

Referring again to menu area 232 in FIG. 2, users may access search and index functionality available on the website by selecting "Search" in menu area 232. In one embodiment, a page comprising the search and index functionality may then be presented to the user. FIG. 6 shows exemplary Guide page 600, which comprises user-selectable tabs 602 and 604. Search tab 602, when selected, may provide content searching functionality to the user. Browse tab 604, when selected, may provide content browsing functionality to the user.

The search and index functionality is implemented using the meta-data that is associated with all content on the broadband creativity platform. Examples of content meta-data include, but are not limited to, content titles, descriptions, creator(s), credits, copyright information, keywords, genre (for example, comedy, drama, horror), and sub-genre (for example, romantic comedy or gothic horror).

When the content is licensed from independent providers by the website or owned by the website, the meta-data may be associated with the content by a website administrator as the content is programmed into the system. Thus, a website administrator may assign particular meta-data to content and store the content in a database.

Furthermore, as discussed above, in some embodiments, the website may reserve and assign storage space in a database for personalized media content items that a user may upload to the website. When uploading the media content, users may enter meta-data for the media content (for example, in free text-entry boxes that appear in pop-up windows displayed to the user during an upload process).

Whether the meta-data is entered by the website administrator or by the user, meta-data may be used to store, organize, and manage the content that is available on the website. In addition, as stated above, content within the database may be searched by the meta-data.

The broadband creativity platform may provide search functionality to the user through both a basic and advanced search. The basic search may enable the user to search for content by meta-data such as, but not limited to keywords, creator, and/or feature type. The advanced search may enable the user to search for content by meta-data such as, but not limited to, keywords, creator, feature type, feature sub-type, genre, sub-genre, and publication date range. After a search is performed, the user may then view a "Search Results" list displaying the content on the website that matches the user's search criteria.

In addition to the basic and advanced search functions described above, the user is also enabled to search for content within a graphical index or "guide" of website content. The guide displays to the user a hierarchical listing of all content on the website. Within the displayed hierarchy, content is organized into expandable branches. Upon selection by a user, the branch may expand to show a number of levels. Each expanded level may show selections included within each category of meta-data.

As shown in FIG. 6, search tab 602 is highlighted, indicating that the user has selected search tab 602. When search tab 602 is selected, the basic search functions may be displayed to the user. The basic search functions may enable the user to enter keywords for which a search is to be performed, as well as to specify search criteria and parameters, such as what type of content is to be searched.

The user may enter keywords for the search in "Enter keywords" free text entry box 606. The user may search by all the words entered in Enter keywords free text entry box 606 by selecting the "All words" user-selectable operator in selection area 608. Alternatively, the user may search for the exact phrase entered in Enter keywords free text entry box 606 by selecting the "Exact phrase" user-selectable operator in selection area 608.

The user may then select a "Creator" (i.e., a source) of the content in selection area 610. In one embodiment, the "creator" of the content may be either the website, website member, or both the website and the website member. When "Website" is selected as the creator, the user is specifying that the search is to be performed, for example, only within content owned or licensed by the website. In the alternative, the user may choose to search only "Member" content. When "Member" is selected as the creator, the user is specifying that the search is to be performed, for example, only within content created by a user and uploaded to the website. Finally, when "All" is selected as the creator, the user may specify that the search is to be performed, for example, in both within the website's content and within the website members' content. In one embodiment, if the user does not make a selection in selection area 610, the default may be "All."

The user may then select a "Feature Type" for the content in selection area 612. In one embodiment, the "Feature Type" of the content may be feature types including, but not limited to, "All," "Animation," "Asset pack," "Audio," "Community," "Extras," "Page," "Tools," and "Video." When one of these feature types is selected, the user may specify that the search is to be performed only for the specified feature type. For example, if the user selects Asset Pack, a search for asset packs containing the text entered in Enter keywords free text entry box 606 may be performed. Similarly, if the user selects Page, a search for pages containing the text entered in Enter keywords free text entry box 606 may be performed. In one embodiment, if the user does not make a selection in selection area 612, the default may be "All." When All is selected, a search may be performed for all content on the website containing the text entered in Enter keywords free text entry box 606.

The results of a search may be displayed in results display box 616. Static text area 61 8 may display instructions to the user. For example, static text area 61 8 may display instructions for sorting the search results or instructions for refining the search if the number of the results exceeds a pre-determined number. Static text area 620 may display the results of the search to the user. For example, static text area 620 may display a number of content items, asset packs, and/or pages that matched the user's search criteria. If the number of results listed exceed the number that may be shown on one page, then page selection area 622 may enable the user to jump between pages of results, For each item listed in results display box 618, the content name 624 may be displayed. This name may be a hyperlink which may, when selected, launch a popper or page, depending on the feature type of the content. For example, if the feature type is audio, a media popper may be launched to play the audio file. As a further example, if the feature type is a page, then a Web page may be launched. As yet another example, if the feature type is an asset pack, then a download tools page may be launched.

Each content item may be associated with a particular project. For example, a content item may be associated with a show presented on the website. The content item's project association 626 may be displayed in display box 616. Each content item may be further associated with a publish date 628. This may be the date on which the content item was first placed in the database. In one embodiment, information about the content item may be obtained by selecting an information user-selectable operator 630 that may be displayed adjacent to the content item.

In one embodiment, the list of content items may be sorted, for example, in ascending or descending alphabetical order, by selecting user-selectable operator 632. The content items may also be sorted by ascending or descending publish dates by selecting user-selectable operator 634.

In one embodiment, when a user rolls over (for example, with the mouse cursor) one of the listed content items, the user may be presented with rollover display box 636. The rollover display box 636 may, for example, describe the content item or provide other information to the user about the content item when the user rolls over the content item. In addition, in some embodiments, an icon, for example, a genre icon, may be displayed in rollover display box 636.

Figure 7:
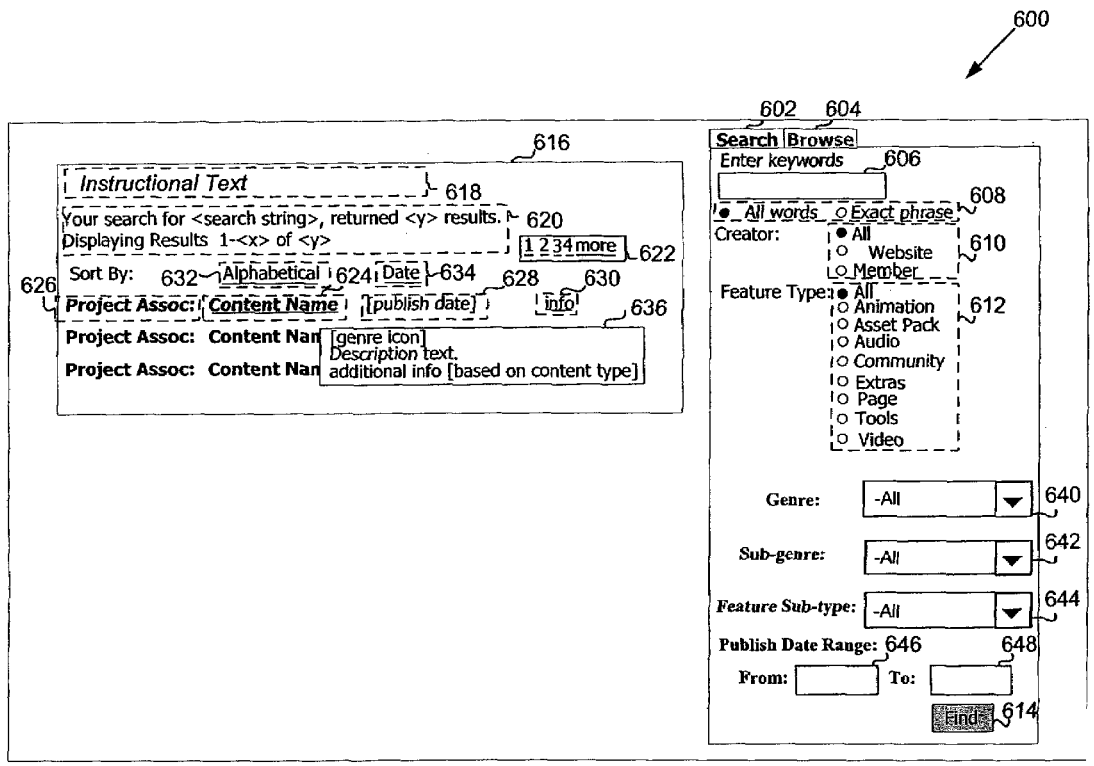
FIG. 7 shows an exemplary Guide page with advanced search functionality, according to an embodiment of the invention.

The user may use the platform's advanced search functions by selecting "Advanced Search" user-selectable operator 638. When the Advanced Search user-selectable operator 638 is selected, the user may be-presented with additional search options, as shown in FIG. 7. The additional options allow the user to search for content items by genre, sub-genre, feature sub-type, and publish date. When selected, Genre pulldown box 640 may present to the user a list of genres available on the website from which the user may choose. In one embodiment, the genre list may include, but is not limited to, "Action," "Comedy," "Drama," "Music," and "Science Fiction/Horror." The user may also be able to search for content items in all genres by selecting "All." In one embodiment, if the user does not make a genre selection, the genre will default to All.

Similarly, when selected, Sub-genre pulldown box 642 may present to the user a list of sub-genres available on the website for the genre selected in Genre pulldown box 640. As an example, if the user selected comedy in Genre pulldown box 640, the user may be able to choose "Romantic Comedy" or "Slapstick Comedy." from the list displayed in Sub-genre pulldown box 642. The user may also be able to search for content items in all sub-genres by selecting "All." In one embodiment, if the user does not make a sub-genre selection, the sub-genre will default to All.

When Feature Sub-type pulldown box 644 is selected, a list of feature sub-types available on the website for the feature type selected in selection area 612 may be displayed to the user. As an example, if the user has chosen "Video" in selection area 612, the user may be able to choose to search only for video content with the video feature sub-type of, for example, "trailer," "behind-the-scenes clip" or "interview." As an additional example, if the user has chosen "Asset Pack" in selection area 612, the user may be able to choose to search only for asset packs with the asset pack feature sub-type of, for example, "audio," a "video" or "special effects." Alternatively, the user may be able to search for content items in all feature sub-types by selecting "All." In one embodiment, if the user does not make a feature sub-type selection, the feature sub-type will default to All.

The user may also narrow the search further to content items that were published within a particular date range by entering a "From" date in free text entry box 646 and a "To" date in free text entry box 648. The search may then only return content that was published on the website within the selected publish date range.

When the user has entered all the desired criteria, the user may select the "Find" user-selectable operator 614 to perform the search. As with the basic search, the results of a search may be displayed in results display box 616.

The basic and advanced searches allow a user to search based on criteria chosen by the user. In addition, the broadband creativity platform enables the user to locate website content by means of a graphical index referred to as the "guide." The guide is advantageously designed to present to a user a graphical, hierarchical index comprising representations of categories of content available on the website. Thus, employing the guide, the user may more easily navigate through content available on the website, especially when the user may be unfamiliar with what content may be available.

While hierarchical menus or indexes of content within a website may be known, they are usually implemented in HTML or DHTML and must be updated by programmers or administrators as the content on the website is changed. In contrast, in one embodiment, the guide is generated in Flash and is dynamic, i.e., after it has been generated, it may be automatically updated as content is added to or deleted from the website, or as content on the website is modified (for example, by editing of associated meta-data). Content may be added, deleted, and/or modified by website administrators through, for example, a content management system. In addition, content may be created, deleted, and/or modified by website users and uploaded by the users to storage space provided by the broadband creativity platform.

As discussed above, content incorporated into the website, from whatever source, may be associated with meta-data that describes or classifies the content. The guide uses this meta-data to dynamically incorporate the content into the guide.

The guide is organized into various branches and levels based on the associated meta-data. Each of the various branches represent a category and sub-categories of meta-data and may comprise a number of levels, the levels being expandable upon selection by the user. The branches may represent one or more hierarchies of categories and sub-categories (meta-data) in a visual form. Each level may represent sub-categories of meta-data included within each category.

Figure 8:
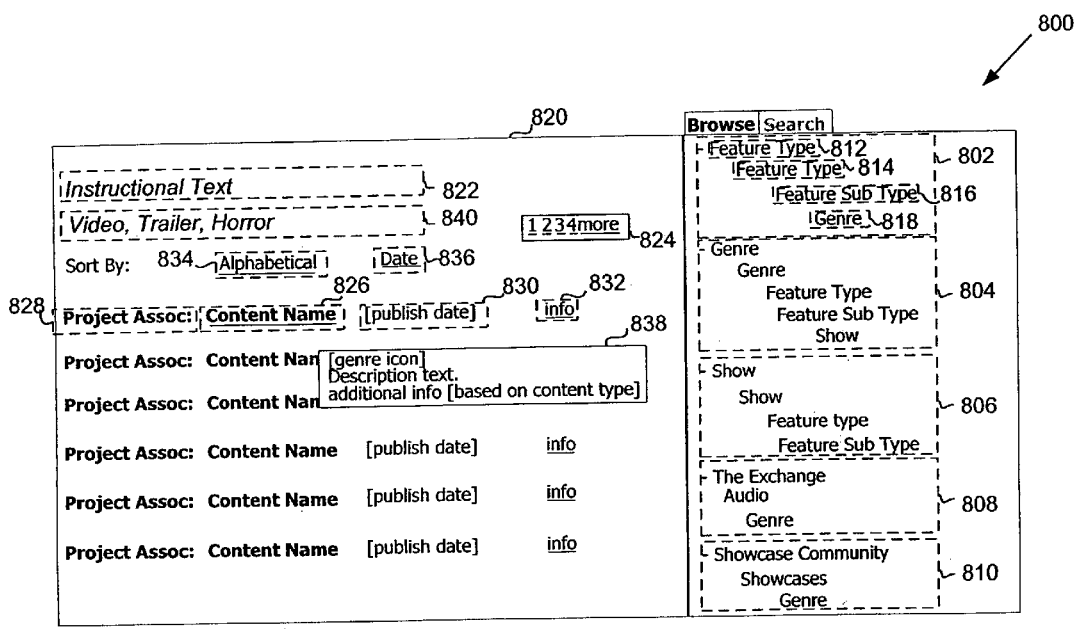
FIG. 8 shows an exemplary Guide page with a graphical index of website content providing browsing functionality, according to an embodiment of the invention.

To view the guide, the user may select Browse tab 604, shown in FIG. 6. When selected, Browse tab 604 displays to the user a graphical index of website content, as shown in FIG. 8. The graphical index comprises a tree structure including various branches of categories and sub-categories associated with content items available on the website. The categories and sub-categories may correspond to meta-data associated with content items. For example, in one embodiment, the categories and sub-categories within the tree structure may include feature type, feature sub-type, genre, and sub-genre. These categories and sub-categories may be sorted and arranged in various hierarchies within the various branches. Exemplary hierarchical branches of categories and sub-categories are shown in FIG. 8 as branches 802, 804, 806, 808, and 810.

Each branch comprises various selectable levels. When selected, a level may expand to display to the viewer sub-categories included within each category. In one embodiment, the highest level within each branch, for example, level 812 in branch 802, may comprise static text which may be merely descriptive of its respective branch and may not be selectable or expandable by the user. As an example, the static text within level 812 provides a description of the first branch 802 of levels within the tree structure.

The various branches within the tree structure may enable the user to browse through categories and sub-categories of content items based on different beginning criteria. For example, if the user wishes to begin browsing with the feature type of the content item, the user may use branch 802 to do so. Similarly, if the user wishes to begin browsing with the genre of the content item, the user may use branch 804 to do so. In one embodiment, the user may also be able to begin browsing according to shows available on the website by beginning in branch 806.

In addition, in some embodiments, users may be able to exchange with each other content items which they may have uploaded to the website. In this embodiment, the tree structure may include branch 808, which may enable a user to browse by category the content items that are available for exchange on the website. Furthermore, in some embodiments, users may be able to create a showcase page where they may display, for example, content items which they have created or edited using digital tools and assets that may be available on the website. In this embodiment, the tree structure may include branch 810, which may enable a user to browse the user showcase pages available on the website by category (for example, genre).

As an example of how the guide may be used, a user wishing to browse for content items starting with the feature type may select "Feature type" level 814. When selected, Feature Type level 814 may expand to display a list of feature types available on the website. Examples of available feature types include, but are not limited to, video, audio, and animation. The user may then select one of the feature types by clicking (or otherwise selecting) the desired feature type. In addition, the user may select "All" to display all feature types available on the website.

When the user has selected the feature type, content items matching the selected feature type may be displayed in display box 820. Static text area 822 may display instructions to the user regarding displayed content items. For example, static text area 822 may display instructions for sorting the displayed content items. If the number of content items listed exceed the number that may be shown on one page, then page selection area 824 may enable the user to jump between pages of results by selecting the page number form the listing of pages displayed.

For each content item listed in display box 820, the content name 826 may be displayed. This name may be a hyperlink which may, when selected, launch a popper or page, depending on the feature type of the content. For example, if the feature type is audio, a media popper may be launched to play the audio file. As a further example, if the feature type is a page, then a Web page may be launched. As yet another example, if the feature type is an asset pack, then a download tools page may be launched.

Each content item may be associated with a particular project. For example, a content item may be associated with a show presented on the website. The content item's project association 828 may be displayed in display box 820. Each content item may be further associated with a publish date 830. This may be the date on which the content item was first placed in the database. In one embodiment, information about the content item may be obtained by selecting an information user-selectable operator 832 that may be displayed adjacent to the content item.

In one embodiment, the list of content items may be sorted, for example, in ascending or descending alphabetical order, by selecting user-selectable operator 834. The content items may also be sorted by ascending or descending publish dates by selecting user-selectable operator 836.

In one embodiment, when a user rolls over (for example, with the mouse cursor) one of the listed content items, the user may be presented with rollover display box 838. The rollover display box 838 may, for example, describe the content item or provide other information to the user about the content item when the user rolls over the content item. In addition, in some embodiments, an icon, for example, a genre icon, may be displayed in rollover display box 838.

The user may choose to reduce the displayed content items for a particular feature type (category) by selecting "Feature Sub-type" (sub-category) level 81 6. When selected, Feature Sub-type level 816 may display to the user feature sub-types available for the selected feature type. As an example, if the user has chosen "Video" as the feature type, the user may be able to choose to browse only content items with the video feature sub-type of "trailer." Thus, content items may only be displayed if they are associated with both "Video" (category) and "trailer" (sub-category). Content items not associated with both the feature type and feature sub-type selected by the user may be "filtered out" and may not be displayed in display box 820. Therefore, the user may be able to browse through a reduced number of content items to find those content items of interest to the user.

Alternatively, by selecting "All," the user may increase the number of content items displayed by including all feature sub-types. In one embodiment, if the user does not make a feature sub-type selection, the feature sub-type may default to All.

The user may further reduce the number of content items displayed by clicking (or otherwise selecting) "Genre" level 818. When selected, Genre level 818 may display to the user genres available for the selected feature type. As an example, if the user has chosen "Video" as the feature type, the user may be able to choose to browse only for content items with the genre of "horror." Alternatively, the user may be able to browse for content items in all available genres by selecting "All." In one embodiment, if the user does not make if the user does not make a genre selection, the genre may default to All.

In one embodiment, when the user has selected a genre, the display box 820 may be updated to display only those content items matching the selected feature type, feature sub-type, and genre. Thus, content items not matching the feature type, feature sub-type, and genre selected by the user may be "filtered out" and may not be displayed in display box 820.

in one embodiment, the path (branches and levels) which the user has traversed to arrive at the current display in display box 820 may be shown in static text area 840. For example, a path for the example browsing procedure described above is shown in static text area 840.

Thus, the guide enables the user to rapidly navigate through the available content on the website by simply selecting branches and levels and thus filtering out undesired content. In this way, the user may locate the desired content more easily. New content is automatically incorporated into the guide's hierarchical tree structure without input from website administrators. Thus, the guide is advantageously updated automatically, Thus, embodiments of the dynamically updateable graphical index described above enable the website user to rapidly navigate through content available on the website by selecting levels within branches of a hierarchical tree structure representing various categories of content.

In addition, embodiments of the dynamically updateable graphical index described above enable a user to see a display of content corresponding to the selected level.

In addition, embodiments of the dynamically updateable graphical index described above enable rapid and automatic updating of the index when content is added or deleted from the website.

Furthermore, embodiments of the dynamically updateable graphical index described above enable the user to search for content on the website based on hierarchical categories of information about content.

The embodiments of the dynamically updateable graphical index described above focus on implementations for a network server computer system accessible through the World Wide Web and the Internet as a website (referred to as the "website"). However, many or all of the systems and processes described may be readily adapted to other data connections as well, including, but not limited to, other Internet connection interfaces (for example, an FTP server), private networks (for example, a network provided by an ISP for its subscribers), and direct connections (such as a directly wired set of stations in a limited area such as a hotel, office building, educational facility or the like).

In addition, implementations are described in which a website user accesses the website using a computer system, which may be a personal computer system or other suitable computer system. However, many or all of the systems and processes described may be readily adapted to other UNDs employed to access and download data through a server, including, but not limited to, a television with a connected or internal cable modem and hard disk, personal digital assistants (PDAs), media players, mobile telephone devices, or any other suitable network enabled device with a storage device for storing content and/or display mechanism for playing or displaying media content to the user.

Various embodiments of the present invention may include one or more of the features and functions described above. One example embodiment includes all the features and functions described above.

These and other objects, features, and advantages of embodiments of the invention will be apparent to those skilled in the art from the foregoing detailed description of embodiments of the invention, when read with the drawings and appended claims. It is to be understood that even though numerous characteristics and advantages of embodiments of the present invention have been set forth in the foregoing description, together with details of the structure and function of embodiments of the invention, this disclosure is illustrative only. Changes may be made in detail, especially matters of structure and management of parts within the principles of the present invention to the full extent indicated by the broad general meaning of the terms in which the appended claims are expressed.

Having disclosed exemplary embodiments and the best mode, modifications and variations may be made to the disclosed embodiments while remaining within the scope of the invention as defined by the following claims.

What is claimed is:

1. A system, comprising:
    a user network device, including a display device, said user network device configured to provide user interface for connecting to a network; and
    a server device, including:
        a storage device;
        a network interface device for interfacing with said user network device; and
        a processor programmed to:
            store a plurality of media content items on said storage device;
            associate each of said plurality of media content items with at least one of a plurality of media content containers;
            generate on said display device a graphical index of representations of each of said plurality of media content containers, each representation being selectable for displaying on said display device said media content items associated with said selected media content container;
            add media content items to and/or delete media content items from said storage device after generation of said graphical index;
            modify media content items stored on said storage device after generation of said graphical index; and
            automatically, dynamically update display of said graphical index of said associated media content container in response to addition, deletion or modification of media content items.

2. The system of claim 1, wherein said processor is further programmed to
    sort said plurality of media content containers according to ascending or descending alphabetical order and according to ascending or descending publish date.

3. The system of claim 1, wherein said plurality of media content items is a plurality of images.

4. The system of claim 1, wherein at least one of said plurality of media content items is associated with meta-data that describes or classifies said least one of said plurality of media content items.

5. The system of claim 1, wherein said adding of media content item includes creating, copying, and uploading media content items.

6. The system of claim 1, wherein said processor is further programmed to allow a user to share media content item with other users.

7. The system of claim 1, wherein said network comprises the Internet and said user interface comprises a website.

8. The system of claim 7, wherein a user logs in at said web site using a user identifier and password.

9. The system of claim 1, wherein said modifying media content items includes applying digital assets.

10. The system of claim 9, wherein said digital assets include special effects.

11. A method, comprising:
    storing a plurality of media content items on a server side storage device;
    associating each of said plurality of media content items with at least one of a plurality of media content containers;
    generating on client side display device a graphical index of representations of each of said plurality of media content containers, each representation being selectable for displaying on said client side display device said media content items associated with said selected media content container;
    adding media content items to and/or delete media content items from said server side storage device after generation of said graphical index;
    modifying media content items stored on said server side storage device after generation of said graphical index; and
    automatically, dynamically updating display of said graphical index of said associated media content container in response to addition, deletion or modification of media content items.

12. The method of claim 11, further comprising
sorting said plurality of media content containers according to ascending or descending alphabetical order and according to ascending or descending publish date.

13. The method of claim 11, wherein said plurality of media content items is a plurality of images.

14. The method of claim 11, further comprising
associating at least one of said plurality of media content items with meta-data that describes or classifies said at least one of said plurality of media content items.

15. The method of claim 11, wherein said adding of media content items includes
creating, copying, and uploading media content items.

16. The method of claim 11, further comprising
allowing a user to share media content items with other users.

17. The method of claim 11, wherein said modifying media content items includes
applying digital assets.

18. The method of claim 17, wherein said digital assets include special effects.

19. A server side apparatus, comprising:
a storage device;
a network interface device for interfacing with a client side apparatus; and
a processor programmed to:
  store a plurality of media content items on said storage device;
  associate each of said plurality of media content items with at least one of a plurality of media content containers;
  generate on a client side display device connected to said client side apparatus, a graphical index of representations of each of said plurality of media content containers, each representation being selectable for displaying on said client side display device said media content items associated with said selected media content container;
  add media content items to and/or delete media content items from said storage device after generation of said graphical index;
  modify media content items stored on said storage device after generation of said graphical index; and
  automatically, dynamically update display of said graphical index of said associated media content container in response to addition, deletion or modification of media content items.

20. A client side apparatus, comprising:
a client side display device; and
a network interface device configured to interface with a server side device, said network interface device operating to upload a plurality of media content items to be stored on a server side storage device coupled to said server side device,
wherein said network interface device processes said plurality of media content items to be unloaded by:
  requesting the server side device to associate each of said plurality of media content items with at least one of a plurality of media content containers;
  generating a graphical index of representations of each of said plurality of media content containers, each representation being selectable for displaying on said client side display device said media content items associated with said selected media content container;
  requesting the server side device to add media content items to and/or delete media content items from said server side storage device after generation of said graphical index;
  requesting the server side device to modify media content items stored on said server side storage device after generation of said graphical index; and
  enabling the server side device to automatically, dynamically update display of said graphical index of said associated media content container in response to addition, deletion or modification of media content items.

* * * * *